US009163947B2

(12) United States Patent
Kim et al.

(10) Patent No.: US 9,163,947 B2
(45) Date of Patent: Oct. 20, 2015

(54) NAVIGATION SYSTEM AND METHOD FOR CONTROLLING VEHICLE NAVIGATION

(75) Inventors: Heungwon Kim, Seoul (KR); Seungwan Woo, Seoul (KR); Wonkeun Lee, Gwangmyung-si (KR); Haeil Lee, Seoul (KR)

(73) Assignee: Intellectual Discovery Ltd. Co., Seoul (KR)

( * ) Notice: Subject to any disclaimer, the term of this patent is extended or adjusted under 35 U.S.C. 154(b) by 2 days.

(21) Appl. No.: 13/519,397

(22) PCT Filed: Jan. 11, 2011

(86) PCT No.: PCT/KR2011/000160
§ 371 (c)(1),
(2), (4) Date: Sep. 18, 2012

(87) PCT Pub. No.: WO2011/090286
PCT Pub. Date: Jul. 28, 2011

(65) Prior Publication Data
US 2013/0218460 A1  Aug. 22, 2013

(30) Foreign Application Priority Data

Jan. 22, 2010  (KR) .................. 10-2010-0006153

(51) Int. Cl.
*G01C 21/26* (2006.01)
*G07C 5/08* (2006.01)
*G08G 1/0962* (2006.01)
*B62D 41/00* (2006.01)

(52) U.S. Cl.
CPC ............... *G01C 21/26* (2013.01); *B62D 41/00* (2013.01); *G07C 5/085* (2013.01); *G08G 1/09626* (2013.01)

(58) Field of Classification Search
CPC ........ G01C 21/26; B62D 41/00; G07C 5/085; G08G 1/09626
USPC ........................... 701/213, 200, 201; 348/148
See application file for complete search history.

(56) References Cited

U.S. PATENT DOCUMENTS 4,876,651 A * 10/1989 Dawson et al. ............... 701/454
6,570,609 B1 * 5/2003 Heien ........................... 348/148
7,271,716 B2 * 9/2007 Nou ........................... 340/539.13
7,298,764 B2 * 11/2007 Terada ......................... 370/535

(Continued)

FOREIGN PATENT DOCUMENTS

CN    101131323 A    2/2008
CN    101272456 A    9/2008

(Continued)

OTHER PUBLICATIONS

Chinese Office Action issued on Sep. 15, 2014 for Counterpart CN App. No. 201180006697.8.

(Continued)

*Primary Examiner* — John Q Nguyen
*Assistant Examiner* — Michael Kerrigan
(74) *Attorney, Agent, or Firm* — Fox Rothschild LLP

(57) ABSTRACT

The present invention relates to a navigation system and to a method for controlling vehicle navigation. The vehicle navigation includes a storage that saves map data, a communication part that receives, from a vehicle black box installed in the vehicle, visual data captured by the black box, and a control part that acquires location data from the map data and saves the data after mapping the captured visual data with the location data.

15 Claims, 17 Drawing Sheets

(56) References Cited

U.S. PATENT DOCUMENTS

| | | | |
|---|---|---|---|
| 7,792,636 B2* | 9/2010 | Ujino | 701/439 |
| 8,107,971 B1* | 1/2012 | Roberts et al. | 455/456.1 |
| 2005/0162513 A1* | 7/2005 | Chan | 348/118 |
| 2005/0278111 A1* | 12/2005 | Ujino | 701/200 |
| 2006/0104605 A1* | 5/2006 | Park et al. | 386/46 |
| 2007/0173994 A1* | 7/2007 | Kubo et al. | 701/35 |
| 2008/0147267 A1* | 6/2008 | Plante et al. | 701/35 |
| 2008/0231697 A1 | 9/2008 | Yan et al. | |
| 2009/0112470 A1* | 4/2009 | Wu et al. | 701/213 |
| 2009/0315972 A1* | 12/2009 | Rensin et al. | 348/14.02 |
| 2010/0014842 A1* | 1/2010 | Eder et al. | 386/117 |
| 2010/0088017 A1* | 4/2010 | Ujino | 701/201 |
| 2012/0143490 A1* | 6/2012 | Hung | 701/409 |

FOREIGN PATENT DOCUMENTS

| | | |
|---|---|---|
| JP | 2003-032590 | 1/2003 |
| JP | 2003112671 | 4/2003 |
| KR | 1020050121501 | 12/2005 |
| KR | 1020060036259 | 4/2006 |
| KR | 1020080075733 | 8/2008 |
| KR | 1020080091587 | 10/2008 |
| KR | 1020090038960 A | 4/2009 |
| WO | WO 2007/063849 | 6/2007 |
| WO | WO 2008/038604 | 4/2008 |

OTHER PUBLICATIONS

Translation of Chinese Office Action issued on Sep. 15, 2014 for Counterpart CN App. No. 201180006697.8.

English Translation of KR-10-2009-0038960 A, Apr. 22, 2009.

English Abstract for CN 101131323, Feb. 27, 2008.

English Abstract for CN 101272456, Sep. 24, 2008.

* cited by examiner

FIG.13 search result (Seoul city hall)    1/4   X
FN — 20091112_112715.mp4    (A) — VT
AI — Seosomun-dong Jung-gu Seoul
20091112_112715.mp4    (E)
Pyeong-dong Jongno-gu Seoul
20091112_112715.mp4    (M)
Seosomun-dong Jung-gu Seoul
20091112_112715.mp4    (A)
Seosomun-dong Jung-gu Seoul
20091112_112715.mp4    (A)
Seosomun-dong Jung-gu Seoul
view by name    view by address    play video (a)

search result (Seoul city hall)    1/4   X
FN — 20091112_112715.mp4    (A) — VT
AI — Seoul City hall A/S Thinkware Co. Ltd.
20091112_112715.mp4    (E)
Seoul city hall
20091112_112715.mp4    (M)
Seoul city hall main building
20091112_112715.mp4    (A)
Seoul city hall annex
20091112_112715.mp4    (A)
Seoul city hall committee
view by name    view by address    play video (b)

NAVIGATION SYSTEM AND METHOD FOR CONTROLLING VEHICLE NAVIGATION

CROSS REFERENCE TO RELATED APPLICATIONS

This application claims priority to international application no. PCT/KR2011/000160, filed Jan. 11, 2011, which claims priority to Korean application no. 10-2010-0006153, filed Jan. 22, 2010. The contents of the aforementioned applications are incorporated herein by reference.

TECHNICAL FIELD

The present invention relates to a navigation system and, more particularly, to a vehicle navigation system and a vehicle black box.

BACKGROUND ART

With the popularization of the Internet and modification of location information related laws, location based service (LBS) related industries are activated. As one of location based services, a vehicle navigation service which measures a current location of a vehicle or guides a route to a destination is also rapidly activated.

To judge the negligence in an accident occurring when a vehicle stops or runs, objective data is needed in many cases. Accordingly, a vehicle black box capable of providing the objective data is used. However, a conventional vehicle black box provides only simple and superficial information about a vehicle state and cannot effectively meet the demands of users.

DETAILED DESCRIPTION OF THE INVENTION

1. Technical Problems

An object of the present invention is to provide a navigation system which maps image data with location data and stores the mapped data, and a method for controlling a vehicle navigation system.

2. Technical Solutions

According to an aspect of the present invention, a vehicle navigation system includes: a storage for storing map data; a communication unit for receiving, from a vehicle black box installed in a vehicle, image data captured by the black box and obtaining current location data of the vehicle; and a controller for acquiring place data from the map data using the current location data, mapping the received image data with the place data and storing the mapped data in the storage.

According to another aspect of the present invention, a vehicle navigation system includes: a storage for storing map data; a communication unit for receiving image data mapped with location data from a black box installed in a vehicle; and a controller for obtaining place data from the map data using the location data mapped with the received image data, mapping the received image data with the place data and storing the mapped data in the storage.

According to another aspect of the present invention, a vehicle navigation system includes: a storage for storing map data; a communication unit for transmitting location data to a black box installed in a vehicle and receiving image data mapped with the location data from the vehicle black box; and a controller for obtaining place data from the map data using the location data mapped with the received image data, mapping the received image data with the place data and storing the mapped data in the storage.

According to another aspect of the present invention, a vehicle navigation system includes: a storage for storing map data; a communication unit for obtaining location data; and a controller for obtaining place data from the map data using the location data, transmitting the place data to a black box installed in a vehicle through the communication unit, receiving image data mapped with the location data from the vehicle black box through the communication unit, and storing the received image data in the storage.

According to another aspect of the present invention, a method for controlling a vehicle navigation system includes: receiving, from a vehicle black box installed in a vehicle, image data captured by the black box in real time; obtaining current location data of the vehicle; acquiring place data from the map data using the current location data; mapping the received image data with the place data and storing the mapped data.

According to another aspect of the present invention, a computer readable medium stores a program for executing one of the above-mentioned methods.

Advantageous Effects

The navigation system and a method for controlling a vehicle navigation system according to the present invention map image data obtained by a vehicle black box with location data and stores the mapped data, and thus a user can easily search relevant image data or image frame using location data and use the data to determine the cause of an accident and the negligence or fault in the event of a car accident.

Furthermore, it is possible to confirm information on a moving route of an accident vehicle in the event of a car accident by indicating vehicle moving route information obtained using the location data mapped to the image data on a map.

In addition, since only an image corresponding to a predetermined period of time, which is obtained from a specific location, can be displayed, it is possible to confirm only an image captured from a location that is important to determine the cause of a car accident.

BRIEF DESCRIPTION OF THE DRAWINGS

FIG. 13 shows an example of a search result screen according to an embodiment of the present invention;

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts. Further, numerals (e.g. first, second, etc.) used to describe the present invention are merely identifiers for discriminating one component from other components.

A navigation system according to the present invention will now be described in detail with reference to the attached drawings. The terms "module" and "part" used to signify components are used herein to help the understanding of the components and thus they should not be considered as having specific meanings or roles.

Figure 1:
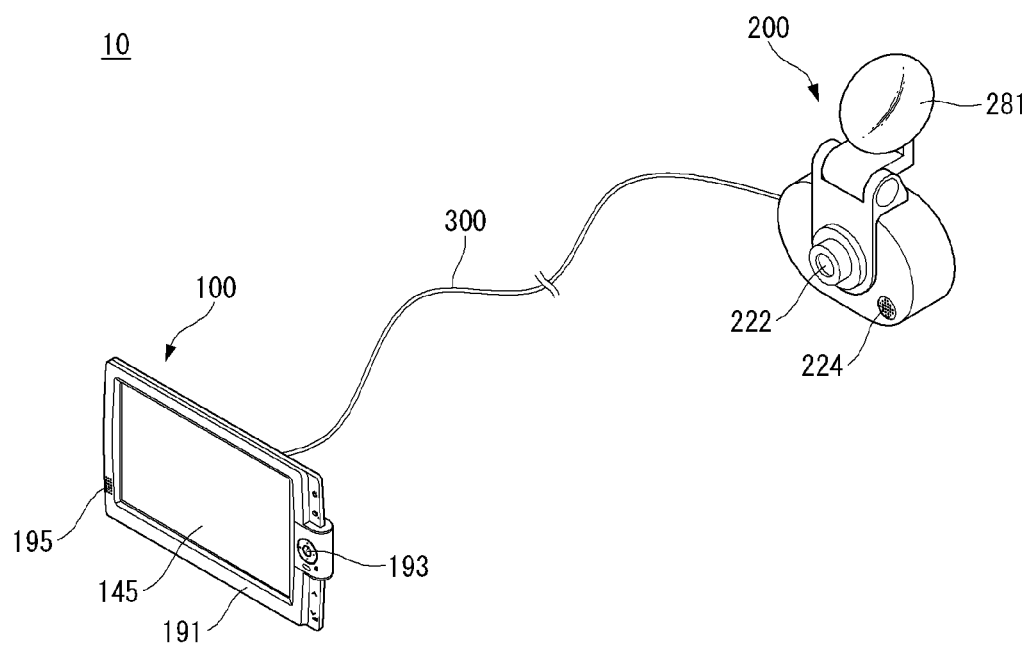
FIG. 1 illustrates a navigation system according to an embodiment of the present invention.

FIG. 1 illustrates a navigation system according to an embodiment of the present invention.

Referring to FIG. 1, the navigation system 10 according to an embodiment of the present invention may include a vehicle navigation system 100 and a vehicle black box 200.

The navigation system 10 may be a system that informs a driver or a passenger of a vehicle of information about driving and maintenance of the vehicle. The navigation system 10 may be the vehicle navigation system 100 in a narrow sense and may be a system including various electronic devices connected with the vehicle navigation system 100 by wire or wirelessly in a broad sense. That is, electronic devices capable of complementing and augmenting the function of the vehicle navigation system 100 can be connected with the vehicle navigation system 100 to implement the integrated navigation system 10. The electronic devices capable of implementing the navigation system 10 by being connected with the vehicle navigation system 100 may include a mobile terminal that can be linked to a mobile communication network, a remote controller, etc. Furthermore, the electronic devices may include the vehicle black box 200. The vehicle black box 200 may be integrated with or separated from the vehicle navigation system 100. While FIG. 1 shows that the vehicle black box 200 is provided separately from the vehicle navigation system 100 and connected with the vehicle navigation system 100 through a communication cable 300, the vehicle black box 200 can be integrated with the vehicle navigation system 100.

The vehicle navigation system 100 may include a display 145 attached to the front of a navigation housing 191, a navigation operation key 193, and a navigation microphone 195.

The navigation housing 191 forms the external appearance of the vehicle navigation system 100. The vehicle navigation system 100 may be exposed to various external environments such as high or low temperature for seasonal reason, direct/indirect external shocks, etc. The navigation housing 191 may protect internal electronic components of the vehicle navigation system 100 from external environment variations and make the external appearance of the vehicle navigation system 100 beautiful. To achieve this, the navigation housing 191 may be formed by injection molding using a material such as ABS, PC or reinforced engineering plastics.

The display 145 visually displays various types of information. Information displayed on the display 145 may include map data combined with route information, images of broadcast programs including DMB broadcast programs, and images stored in a memory. The display 145 may be divided into several regions physically or logically. Physically divided displays mean two or more displays connected to each other. Logically divided displays mean a display of a plurality of independent screens on one display 145. For example, route information is displayed on part of the display 145 while a received DMB broadcast program is displayed on the display 145, or a map and the DMB broadcast program are respectively displayed on different regions of the display 145. With the tendency of convergence of various functions into the vehicle navigation system 100, the display 145 is increasingly logically divided to display various types of information. Furthermore, to display a large amount of information, the screen of the display 145 becomes larger.

All or some of the surface of the display 145 may be a touchscreen capable of receiving a touch input from a user. For example, the touchscreen function can be activated by touching a function selection button displayed on the display 145. That is, the display 145 can function as both an output unit 140 shown in FIG. 3 and an input unit 120 shown in FIG. 3.

The navigation operation key 193 may be provided to execute various functions of the vehicle navigation system 100 or to allow a user to directly input necessary data. Frequently used specific functions may be mapped to the navigation operation key 193 to improve user convenience.

The navigation microphone 195 may be provided to receive sounds including voices. For example, a specific function of the navigation device 100 can be executed on the basis of a voice signal received through the navigation microphone 195. Furthermore, it is possible to detect a current state of the vehicle, such as an accident, on the basis of a sound signal received through the navigation microphone 195.

The vehicle black box 200 may store information necessary for a procedure of dealing with an accident by exchanging signals with the vehicle navigation system 100. For example, When an accident occurs while the vehicle runs, it is possible to analyze an image acquired by the vehicle black box 200 and use the image to determine the details of the accident and a degree of the accident. Furthermore, the vehicle black box 200 connected to the vehicle navigation system 100 can use information stored in the vehicle navigation system 100. For example, it is possible to map images obtained from the vehicle black box 200 with map data stored in the vehicle navigation system 100 to improve the utility of the vehicle black box 200.

The vehicle black box 200 can obtain information on the vehicle when the vehicle runs or stops. That is, the vehicle black box 200 can capture an image not only when the vehicle runs but also when the vehicle stops. The quality of an image obtained through the vehicle black box 200 may be fixed or variable. For example, the picture quality can be increased in the event of an accident and decreased in a normal case so as to store a salient image while minimizing a necessary storage space.

The vehicle black box 200 may include a black box camera 222, a black box microphone 224, and an attachment part 281.

The black box camera 222 can take pictures of the inside and outside of the vehicle. The vehicle black box 200 may include one or more black box cameras 222. When the vehicle black box 200 include a plurality of black box cameras 222, one of the black box cameras 222 may be integrated with the vehicle black box 200 and others may be attached to portions of the vehicle to capture images and transmit the captured images to the vehicle black box 200. When the vehicle black box 200 includes one black box camera 222, the black box camera 222 may be installed such that it can photograph a forward view of the vehicle. Images captured by the black box camera 222 may be stored in the vehicle black box 200 or the vehicle navigation system 100.

The black box microphone 224 may acquire a sound generated from the inside or outside of the vehicle. The black box microphone 224 may execute functions similar to those of the above-mentioned navigation microphone 195.

The attachment part 281 may fix the vehicle black box 200 to the vehicle. The attachment part 281 may be a suction plate capable of attaching the vehicle black box 200 to the windshield of the vehicle or a fixing device capable of combining the vehicle black box 200 with the room mirror of the vehicle.

Figure 2:
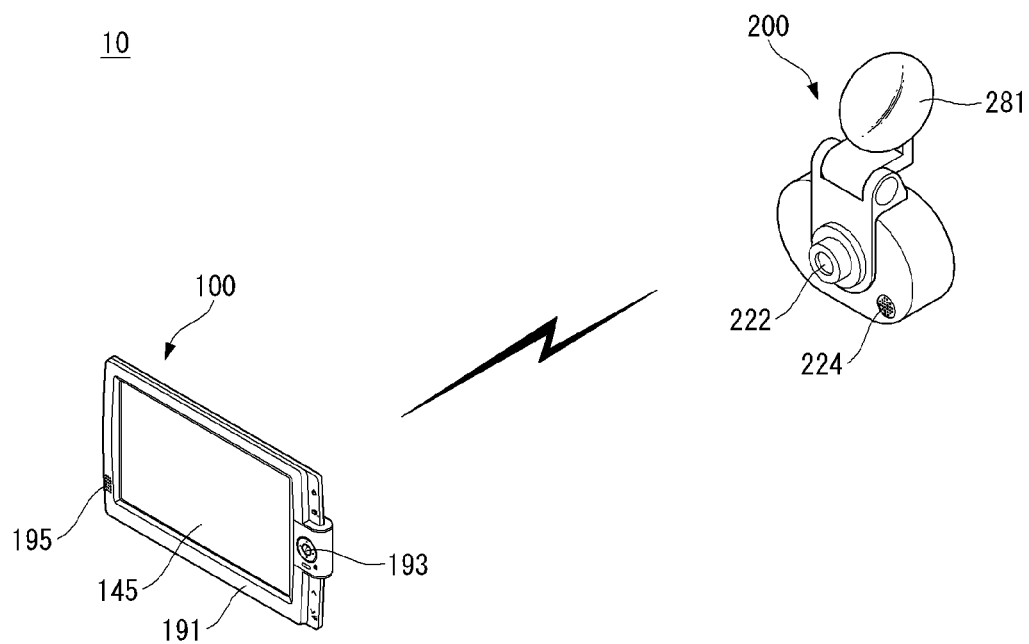
FIG. 2 illustrates a navigation system according to another embodiment of the present invention.

FIG. 2 illustrates a navigation system according to another embodiment of the present invention. Only parts different from the above-described embodiment will now be described.

The navigation system 10 according to another embodiment of the present invention may be wirelessly connected to the vehicle navigation system 100 and the vehicle black box 200. That is, the vehicle navigation system 100 and the vehicle black box 200 may be separate devices having no physical connecting device therebetween. The vehicle navigation system 100 and the vehicle black box 200 may communicate with each other through Bluetooth, RFID (Radio Frequency Identification), IrDA (Infrared Data Association), UWB (Ultra WideBand), ZigBee, etc.

Figure 3:
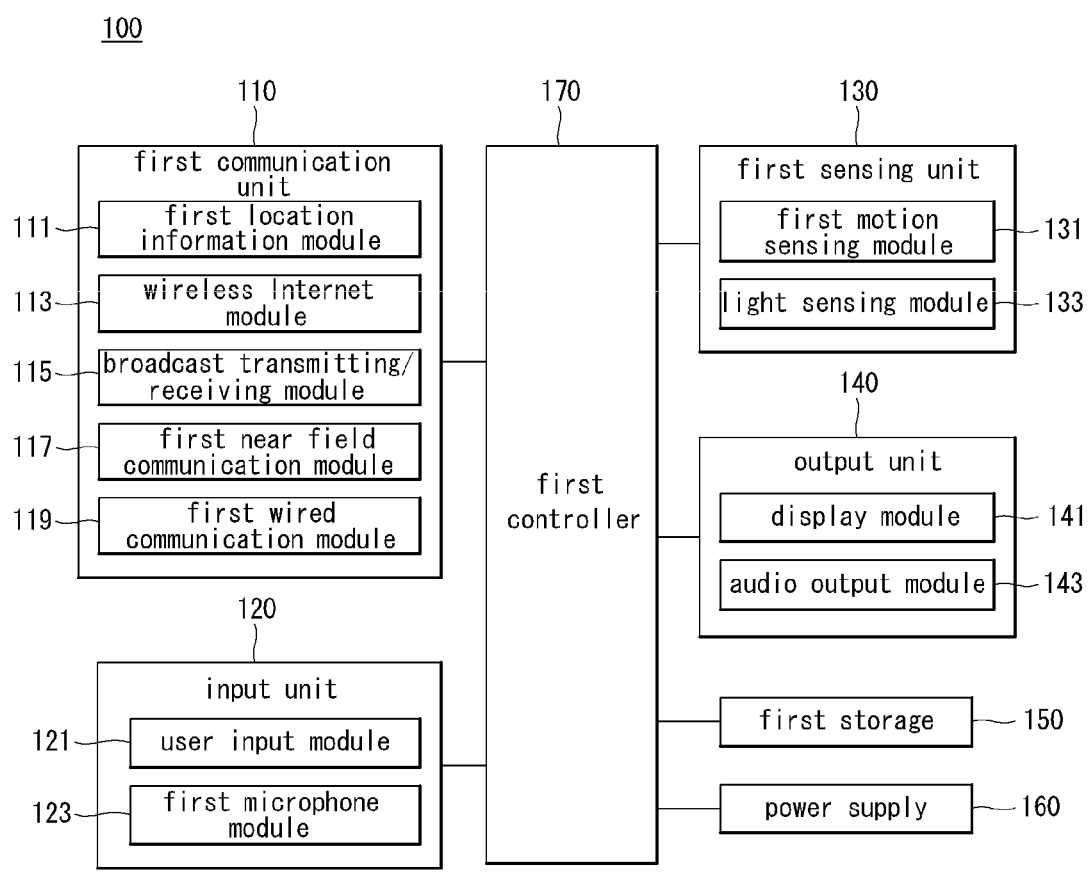
FIG. 3 is a block diagram of a vehicle navigation system shown in FIG. 1.

FIG. 3 is a block diagram of the vehicle navigation system 100 shown in FIG. 1.

Referring to FIG. 3, the vehicle navigation system 100 according to an embodiment of the present invention may include a first communication unit 110, an input unit 120, a first sensing unit 130, an output unit 140, a first storage 150, a power supply 160, and a first controller 170.

The first communication unit 100 is provided for the vehicle navigation system 100 to communicate with other devices. The first communication unit 100 may include a first location information module 111, a wireless Internet module 113, a broadcast transmitting/receiving module 115, a first near field communication module 117, and a first wired communication module 119.

The first location information module 111 acquires location information through a GNSS (Global Navigation Satellite System). The GNSS is a navigation system that calculates the location of a receiver terminal using a radio signal received from an artificial satellite (20 shown in FIG. 5). Examples of the GNSS may include GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The first location information module of the vehicle navigation system 100 may obtain location information by receiving a GNSS signal provided in an area where the vehicle navigation system 100 is used.

The wireless Internet module 113 acquires information or transmits information by accessing wireless Internet. The wireless Internet accessible by the wireless Internet module 113 may include WLAN (Wireless LAN), WiBro (Wireless Broadband), Wimax (World interoperability for microwave access), HSDPA (High speed Downlink Packet Access), etc.

The broadcast transmitting/receiving module 115 transmits/receives broadcast signals through broadcasting systems. The broadcasting systems may include DMBT (Digital Multimedia Broadcasting Terrestrial), DMSS (Digital Multimedia Broadcasting Satellite), MediaFLO (Media Forward Link Only), DVBH (Digital Video Broadcast Handheld), ISDBT (Integrated Services Digital Broadcast Terrestrial), etc. Broadcast signals transmitted/received through the broadcast transmitting/receiving module 115 may include traffic information, living information, images captured by the vehicle black box (200 shown in FIG. 1), etc.

The first near field communication module 117 is a device for near field communication. The first near field communication module 117 can perform communication through Bluetooth, RFID, IrDA, UWB, ZigBee, etc.

The first wired communication module 119 is an interface capable of connecting the vehicle navigation system 100 to other devices by wire. The first wired communication module 119 may be a USB module capable of performing communication through a USB port. The vehicle navigation system 100 according to embodiments of the present invention can communicate with other devices through the first near field communication module 117 or the first wired communication module 119. Furthermore, when the vehicle navigation system 100 communicates with a plurality of devices, the vehicle navigation system 100 may communicate with one of the devices through the first near field communication module 117 and communicate with the other through the first wired communication module 119.

The input unit 120 converts an external physical input applied to the vehicle navigation system 100 into an electric signal. The input unit 120 may include a user input module 121 and a first microphone module 123.

The user input module 121 is a key input unit through which a user can apply an input through a push operation. The user input module 121 may be implemented as the navigation operation key (193 shown in FIG. 1) provided to the exterior of the housing (191 shown in FIG. 1) of the vehicle navigation system 100.

The first microphone module 123 receives a user voice and a sound generated from the inside or outside of the vehicle. The first microphone module 123 may be implemented as the navigation microphone (195 shown in FIG. 1) provided to the exterior of the housing (191 shown in FIG. 1) of the vehicle navigation system 100.

The first sensing unit 130 senses a current state of the vehicle navigation system 100. The first sensing unit 130 may include a first motion sensing module 131 and a light sensing module 133.

The first motion sensing module 131 may sense a three-dimensional motion of the vehicle navigation system 100. The first motion sensing module 131 may include a 3-axis geomagnetic sensor and a 3-axis acceleration sensor. It is possible to calculate a more accurate trace of the vehicle equipped with the vehicle navigation system 100 by combining motion information acquired through the first motion sensing module 131 with location information obtained through the location information module 111.

The light sensing module 133 measures surrounding illuminance of the vehicle navigation system 100. It is possible to control the brightness of the display 145 to be varied with the surrounding illuminance using illuminance information acquired through the light sensing module 133.

The output unit 140 outputs information on the vehicle navigation system 100. The output unit 140 may include a display module 141 and an audio output module 143.

The display module 141 outputs visually recognizable information about the vehicle navigation system 100. The display module 141 may be implemented as the display (145 shown in FIG. 1) provided to the front of the housing (191 shown in FIG. 1) of the vehicle navigation system 100. If the display module 141 is a touchscreen, the display module 141 can function as both the output unit 140 and the input unit 120, as described above.

The audio output module 143 outputs auditorily recognizable information about the vehicle navigation system 100. The audio output module 143 may be implemented as a speaker outputting information that needs to be signaled to users including a driver as sound.

The first storage 150 stores information necessary for operation of the vehicle navigation system 100 and information generated according to the operation. The first storage 150 may be a memory built in the vehicle navigation system 100 or a detachable memory. The information necessary for the operation of the vehicle navigation system 100 may include an OS, route search application, map, etc. The information generated according to the operation of the vehicle navigation system 100 may include information about a searched route, a received image, etc.

The power supply 160 supplies power necessary for the operation of the vehicle navigation system 100 or operations of other devices connected to the vehicle navigation system 100. The power supply 160 may be a device provided with power from a battery set in the vehicle navigation system 100 or an external power supply. The power supply 160 may be implemented as the first wired communication module 119 or a device wirelessly provided with power, according to power supply form.

The first controller 170 outputs control signals for controlling operations of the vehicle navigation system 100. Furthermore, the first controller 170 may output control signals for controlling other devices connected to the vehicle navigation system 100.

Figure 4:
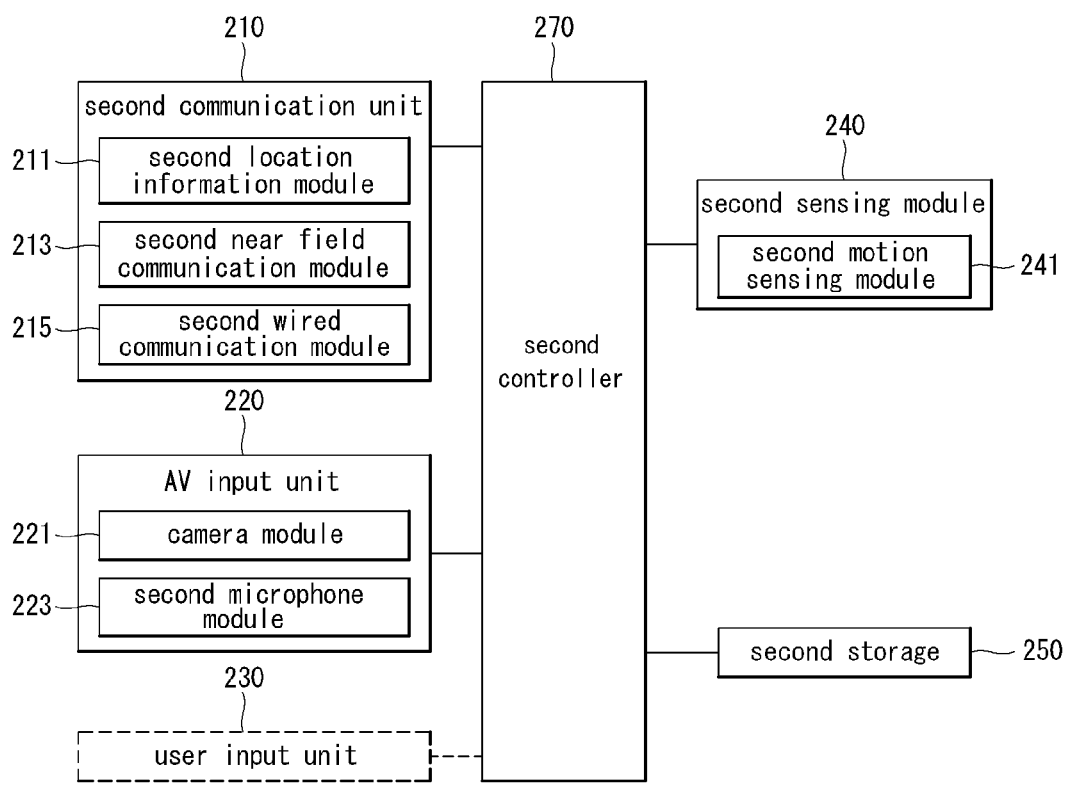
FIG. 4 is a block diagram of a vehicle black box shown in FIG. 1.

FIG. 4 is a block diagram of the vehicle black box 200 shown in FIG. 1.

Referring to FIG. 4, the vehicle black box 200 according to an embodiment of the present invention may include a second communication unit 210, an AV input unit 220, a user input unit 230, a second sensing unit 240, and a second storage 250.

The second communication unit 210 may communicate with the first communication unit 110 of the vehicle navigation system (100 shown in FIG. 3) or other devices. The second communication unit 210 may include a second location information module 211, a second near field communication module 213, and a second wired communication module 215. The second location information module 211 performs an operation similar to that of the first location information module (111 shown in FIG. 3). The second near field communication module 213 can communicate with the first near field communication module (117 shown in FIG. 3) and the second wired communication module 215 can communicate with the first wired communication module (119 shown in FIG. 3).

The AV input unit 220 may acquire sounds and images. The AV input unit 220 may include a camera module 221 and a second microphone module 223.

The camera module 221 may capture images of the inside and outside of the vehicle equipped with the vehicle black box 200. The camera module 221 may be implemented as the black box camera (222 shown in FIG. 1), as described above.

The second microphone module 223 may obtain sounds generated from the inside and outside of the vehicle. The sounds obtained through the second microphone module 223 may be used to control operation of the vehicle black box 200. For example, when a sound with higher intensity is received through the second microphone module 223, the camera module 221 can be controlled to capture an image with higher resolution. The second microphone module 223 may be implemented as the black box microphone 224.

The user input unit 230 is a device through which a user directly operates the vehicle black box 200. The user input unit 230 may be implemented as a push button (not shown) provided to the exterior of the vehicle black box 200. If the vehicle black box 200 is controlled by a control signal of the first controller (170 shown in FIG. 3) of the vehicle navigation system (100 shown in FIG. 3), the user input unit 230 may be excluded from the vehicle black box 200.

The second sensing unit 240 may sense a current state of the vehicle black box 200. The second sensing unit 240 may include a second motion sensing module 241 and performs an operation similar to that of the first motion sensing module (131 shown in FIG. 3). If the second sensing unit 240 is included in the vehicle black box 200, the second sensing unit 240 may not receive information about a three-dimensional motion from the vehicle navigation device 100.

The second storage 250 stores information necessary for operations of the vehicle black box 200 and information generated according to the operations of the vehicle black box 200. The information stored in the second storage 250 may be images captured by the camera module 221. The second storage 250 may be included in the vehicle black box 200 or may be a memory detachably set in the vehicle black box 200.

The second controller 270 outputs control signals for controlling operations of the vehicle black box 200. The second controller 270 may be affected by control signals of the first controller (170 shown in FIG. 3) of the vehicle navigation system (100 shown in FIG. 3). That is, the second controller 270 may be dependent on the first controller (170 shown in FIG. 3).

Figure 5:
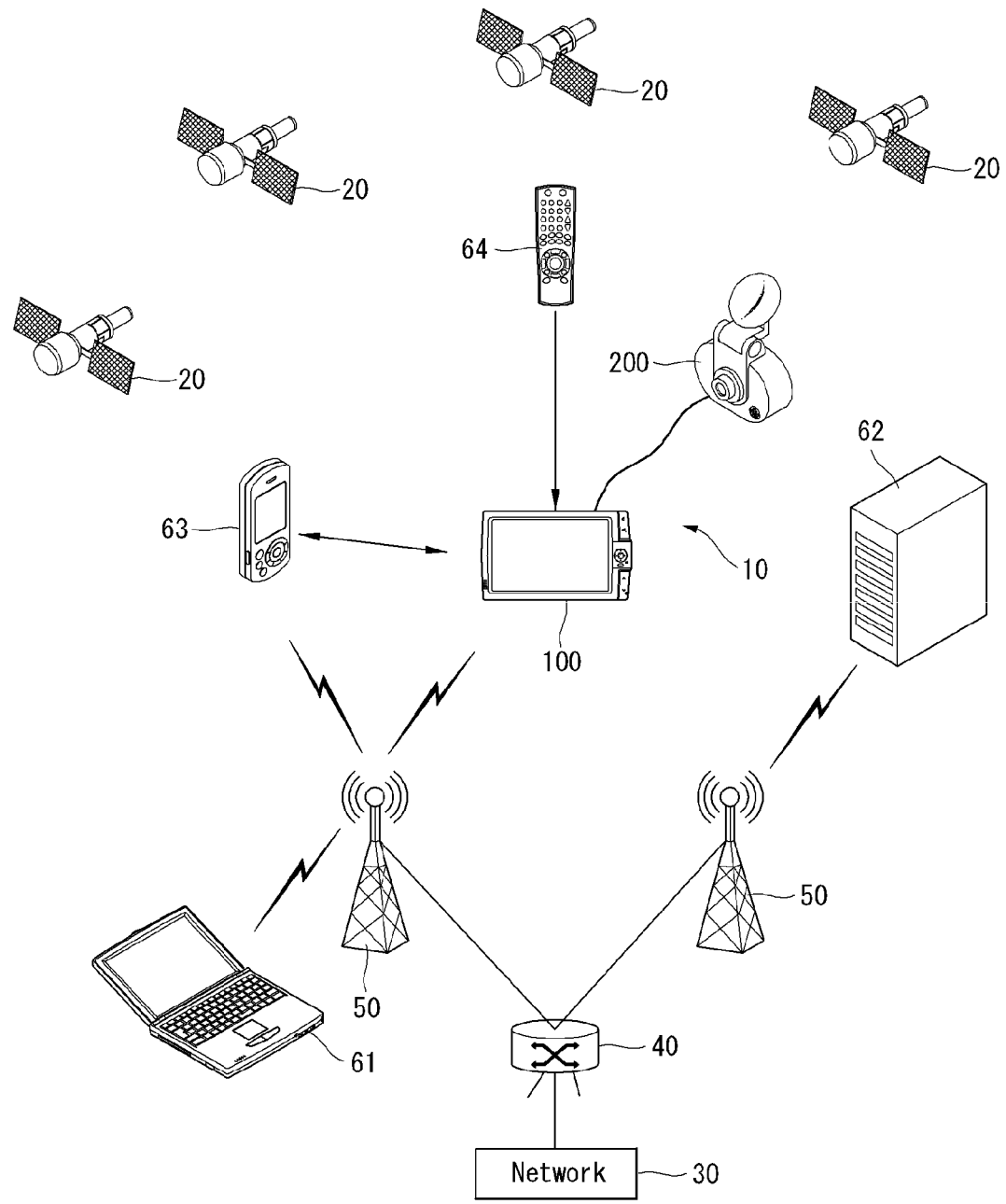
FIG. 5 illustrates a configuration of a communication network including the navigation system shown in FIG. 1.

FIG. 5 illustrates a configuration of a communication network including the navigation system 10 shown in FIG. 1.

Referring to FIG. 5, the navigation system 10 according to an embodiment of the present invention may be linked with various communication networks and other electronic devices 61 to 64.

The navigation system 10 may calculate a current location thereof using radio signals received from artificial satellites 20. The artificial satellites 20 may transmit L-band frequency signals having different frequency bands. The navigation system 10 can calculate the current location thereof on the basis of a time required for the L-band frequency transmitted from each artificial satellite 20 to arrive at the navigation system 10.

The navigation system 10 may wirelessly access a network 30 through a control station (ACR) 40 and a base station (RAS) 50 via the first communication unit (110 shown in FIG. 3). When the navigation system 10 is linked with the network 30, the navigation system 10 can exchange information with the electronic devices 61 and 62 linked to the network 30 by being indirectly with the electronic devices 61 and 62.

The navigation system 10 may indirectly access the network 30 through another device 63 having a communication function. For example, if the navigation system 10 does not include a device through which the navigation system 10 access the network 30, the navigation system 10 can communicate with the other device 63 having the communication function through the first near field communication module (117 shown in FOG. 3) or the like.

An operation of mapping image data with location data according to an embodiment of the present invention will now be described with reference to FIGS. 6 to 9.

FIGS. 6 to 9 are flowcharts illustrating the operation of mapping image data with location data according to an embodiment of the present invention.

The vehicle navigation system (100 shown in FIG. 3) maps image data received from the vehicle black box (200 shown in FIG. 4) with location data, place data, etc. and stores the mapped data in the first storage (150 shown in FIG. 3). Here, the place data is obtained from map data which is stored in the first storage (150 shown in FIG. 3) using location data acquired through the first location information module (111 shown in FIG. 3) of the vehicle navigation system (100 shown in FIG. 3) or the second location information module (211 shown in FIG. 4) of the vehicle black box (200 shown in FIG. 4) and includes address information, road information, POI (Point of Interest) information, etc. The location data includes longitude information, latitude information, etc. The map data stores not only map information but also place information and position information corresponding thereto. Accordingly, it is possible to obtain place data using location data corresponding thereto. The address information is an identifier for identifying a place, which is given by a national institution, a public institution or the like. The address information may be a full address such as "31, Taepyung-no 1-ga, Jung-gu, Seoul" or part of a full address, such as "Taepyung-no 1-ga, Jung-gu, Seoul" or "Yeoksam-dong". The road information is an identifier for identifying a road, which is given by a national institution, a public institution, or the like. For example, the road information may be "Seoul outer ring road", "Route 4", etc. The POI information may correspond to a widely known place such as "Gwanghwamun square" or "City hall square", a subway station name such as "Gangnam station" or "Sadang station", a place name such as "Seorae village", a company name such as "Lotteria" or "Starbucks", a national institution or a public institution such as "Seoul City hall" or "Jongno-gu office", or the like. It is possible to designate a specific place such as "Home", "Office" or the like as POI by a user.

The image data may be obtained through the vehicle black box (200 shown in FIG. 4) for a predetermined time. For example, the image data can be data having a predetermined play time such as one minute, five minutes, etc. Furthermore, the image data may be data having a predetermined size. For example, the image data may have a predetermined size of 1 MB, 5 MB or the like.

The vehicle black box (200 shown in FIG. 4) may transmit image data obtained by capturing the inside of outside of the vehicle to the vehicle navigation system (100 shown in FIG. 3) periodically or at the request of the vehicle navigation system (100 shown in FIG. 3).

As described above, it is possible to provide a new service to the user by mapping image data captured through the vehicle black box (200 shown in FIG. 4) with location data, place data and the like and storing the mapped data and to use the stored data as reference data to determine details of a car accident and a degree of the accident in the event of the accident.

Figure 6:
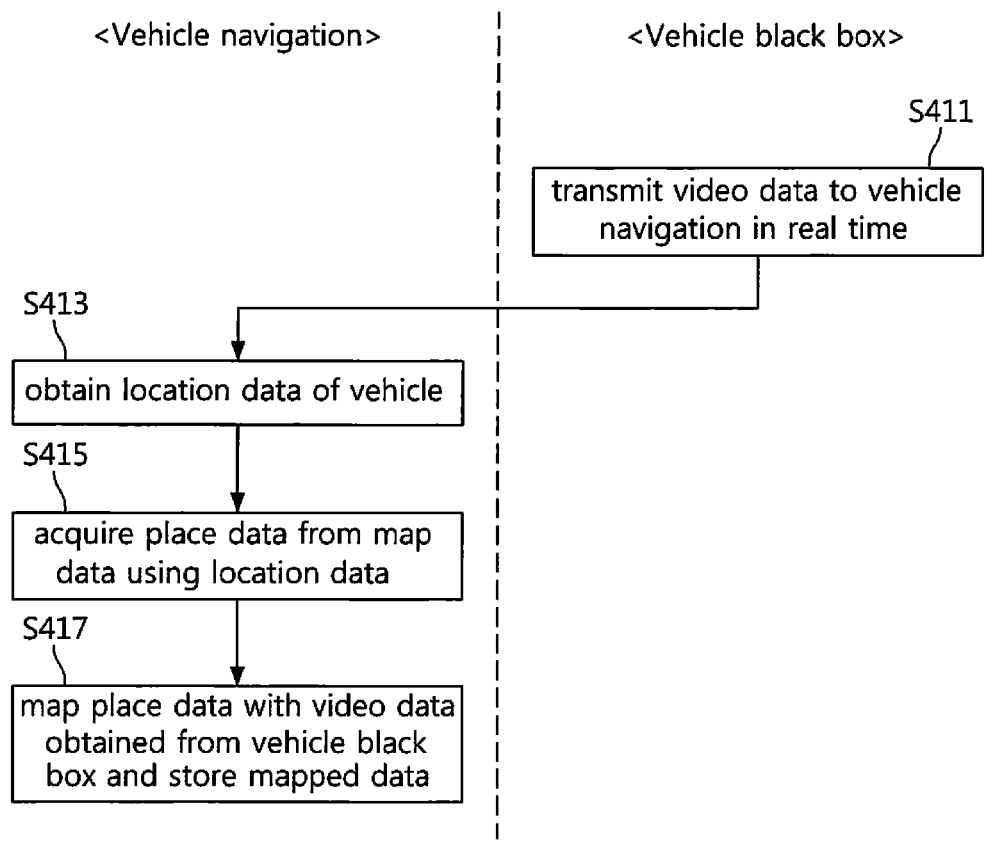
FIGS. 6 to 9 are flowcharts illustrating a procedure of mapping image data with location data according to an embodiment of the present invention.

A procedure of mapping image data with location data according to an embodiment of the present invention will now be described with reference to FIG. 6.

The second communication unit (210 of FIG. 4) of the vehicle black box (200 of FIG. 4) transmits image data obtained by photographing the inside and outside of the vehicle to the vehicle navigation device (100 of FIG. 3) in real time (S411). The first communication unit (110 of FIG. 3) of the vehicle navigation system (100 of FIG. 3) acquires current location data about the vehicle (S413) and the first controller (170 of FIG. 3) obtains location data from the map data stored in the first storage (150 of FIG. 3) using the current location data (S415). The first controller (170 of FIG. 3) of the vehicle navigation system (100 of FIG. 3) maps the image data received from the vehicle black box (200 of FIG. 4) with the location data and stores the mapped data in the first storage (150 of FIG. 3) (S417).

While steps S413 and S415 are performed after step S411 in the present embodiment, steps S413 and S415 may be performed prior to step S411 or carried out simultaneously with step S411.

Figure 7:
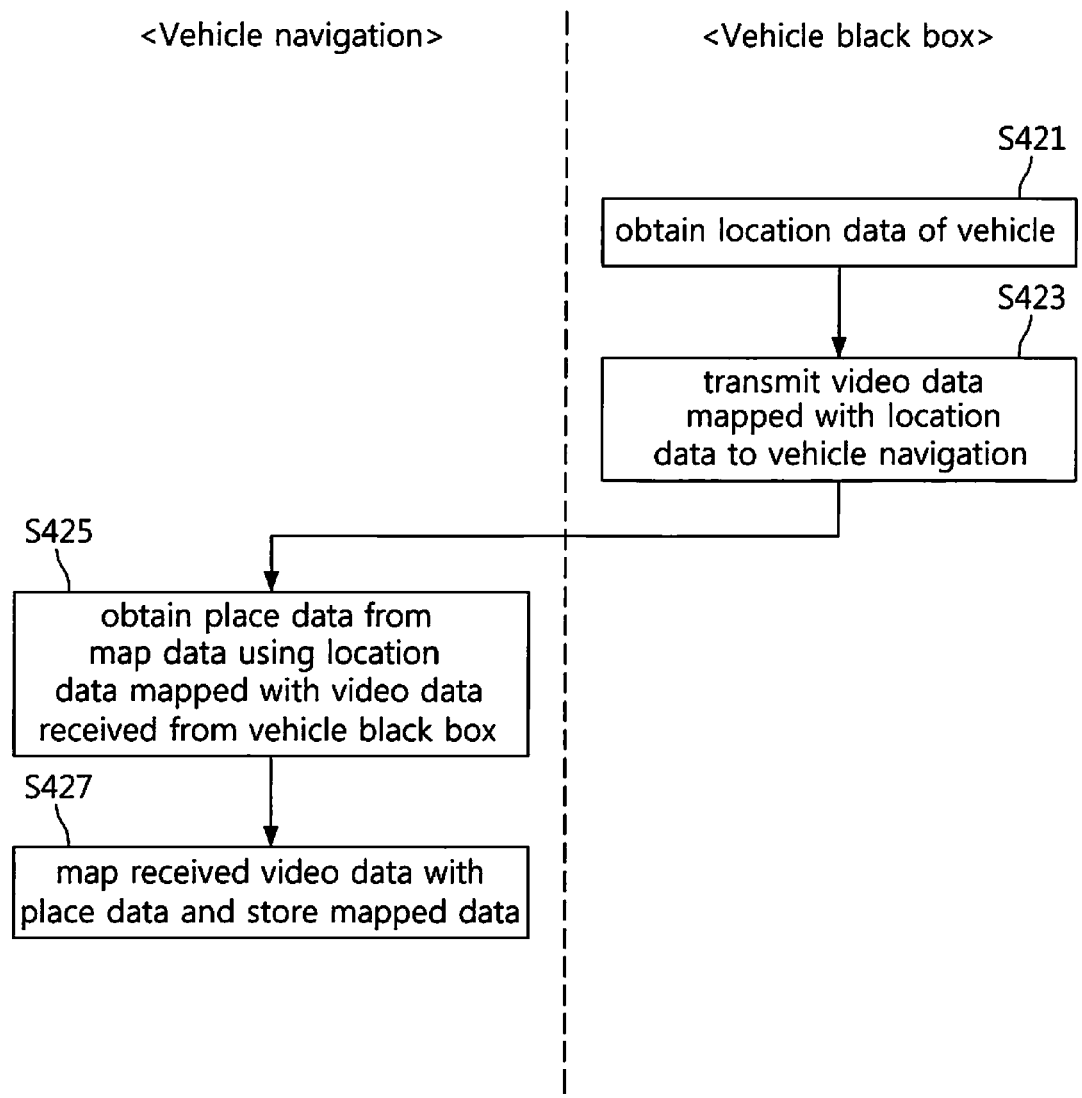

A procedure of mapping image data with location data according to another embodiment of the present invention will now be described with reference to FIG. 7.

The second communication unit (210 of FIG. 4) of the vehicle black box (200 of FIG. 4) obtains location data about the vehicle (S421) and transmits image data mapped with the location data to the vehicle navigation system (100 of FIG. 3) (S423). The first communication unit (110 of FIG. 3) of the vehicle navigation system (100 of FIG. 3) receives the image data from the vehicle black box (200 of FIG. 4) and the first controller (170 of FIG. 3) acquires location data from the map data stored in the first storage (150 of FIG. 3) using the location data mapped with the received image data (S425). The first controller (170 of FIG. 3) of the vehicle navigation system (100 of FIG. 3) maps the received image data with the location data and stores the mapped data in the first storage (150 of FIG. 3) (S427).

Figure 8:
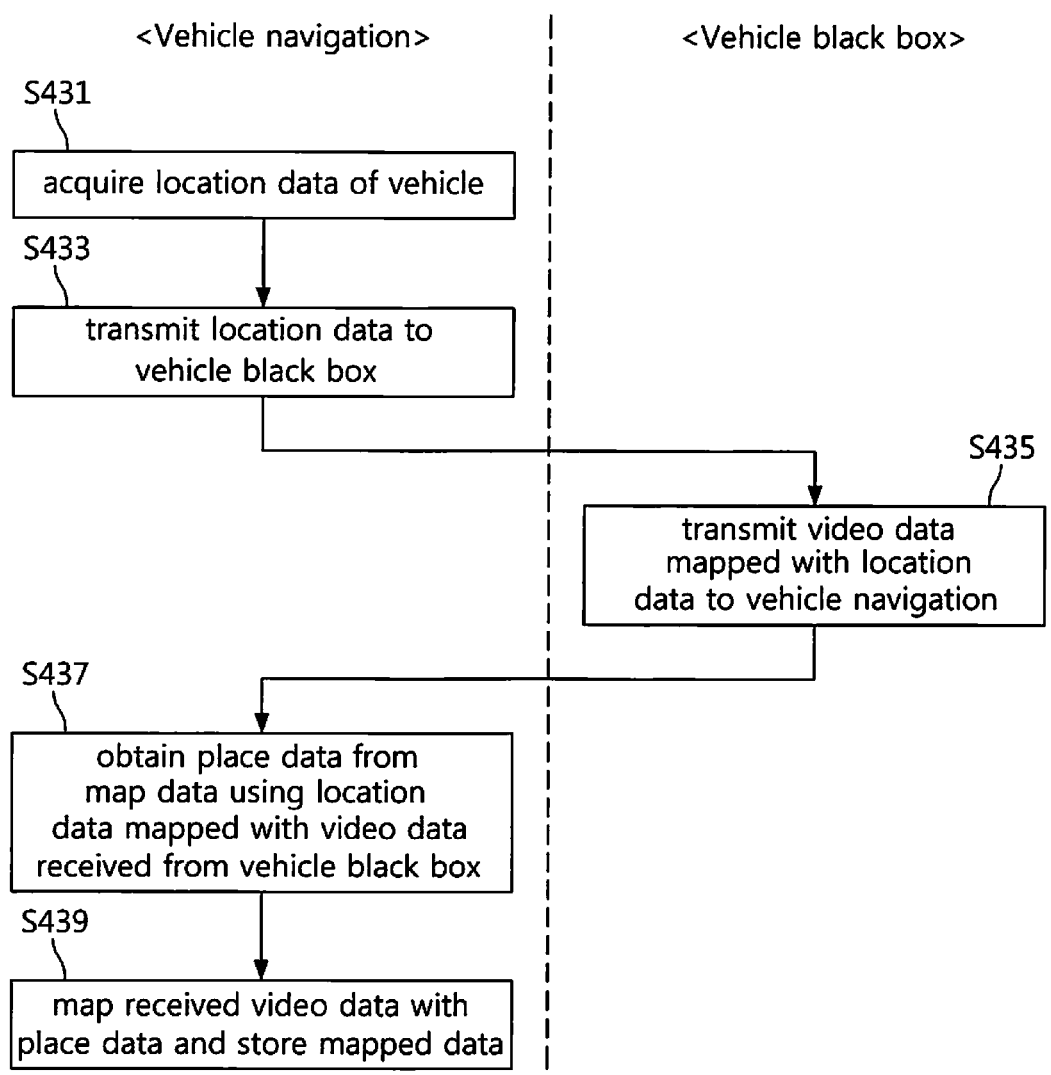

A procedure of mapping image data with location data according to another embodiment of the present invention will now be described with reference to FIG. 8.

The first communication unit (110 of FIG. 3) of the vehicle navigation system (100 of FIG. 3) obtains location data regarding the vehicle (S431) and transmits the obtained location data to the vehicle black box (200 of FIG. 4) (S433). Then, the second communication unit (210 of FIG. 4) of the vehicle black box (200 of FIG. 4) receives the location data from the vehicle navigation system (100 of FIG. 3) and transmits image data mapped with the location data to the vehicle navigation system (100 of FIG. 3) (S435). Subsequently, the first communication unit (110 of FIG. 3) of the vehicle navigation system (100 of FIG. 3) receives the image data from the vehicle black box (200 of FIG. 4) and the first controller (170 of FIG. 3) acquires location data from the map data stored in the first storage (150 of FIG. 3) using the location data mapped with the received image data (S437). The first controller (150 of FIG. 3) of the vehicle navigation system (100 of FIG. 3) maps the received image data with the location data and stores the mapped data in the first storage (150 of FIG. 3).

Figure 9:
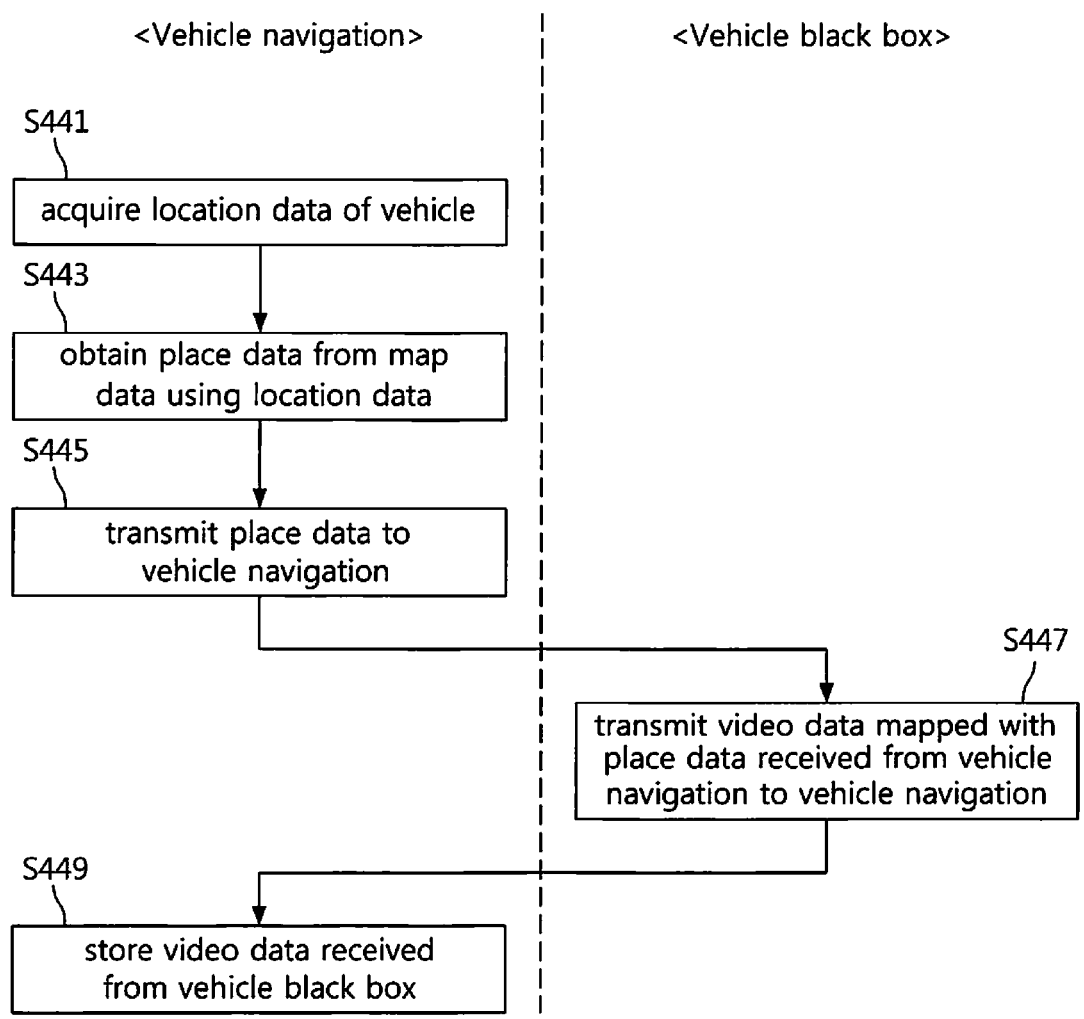

A procedure of mapping image data with location data according to another embodiment of the present invention will now be described with reference to FIG. 9.

The first communication unit (110 of FIG. 3) of the vehicle navigation system (100 of FIG. 3) obtains location data regarding the vehicle (S441) and acquires location data from the map data stored in the first storage (150 of FIG. 3) using the obtained location data (S443). Then, the first communication unit (110 of FIG. 3) of the vehicle navigation system (100 of FIG. 3) transmits the location data acquired from the map data to the vehicle black box (200 of FIG. 4) through the first communication unit (100 of FIG. 3) (S445). The second communication unit (210 of FIG. 4) of the vehicle black box (200 of FIG. 4) receives the location data from the vehicle navigation system (100 of FIG. 3) and transmits image data mapped with the location data to the vehicle navigation system (100 of FIG. 3) (S447). Subsequently, the first communication unit (110 of FIG. 3) of the vehicle navigation system (100 of FIG. 3) receives the image data from the vehicle black box (200 of FIG. 4) and the first controller (170 of FIG. 3) stores the image data in the first storage (150 of FIG. 3) (S449).

The operation of mapping image data with location data according to the present invention will now be described in more detail.

The first controller (170 of FIG. 3) of the vehicle navigation system (100 of FIG. 3) may store location data mapped with image data in the form of a separate file in the first storage 150. That is, the first controller (170 of FIG. 3) can store the location data in a folder in which the image data is stored with a file name of the location data, which equals to the file name of the image data. Here, the location data may include time information and may be synchronized with the image data using the time information. For example, if a total play time of the image data is 10 minutes, and the image data is mapped to place A before 5 minutes and mapped to place B after 5 minutes, the location data includes information about "place A" and information about "place B", which respectively correspond to time information of "0 to 5 minutes" and "5 to 10 minutes".

The first controller (170 of FIG. 3) of the vehicle navigation system (100 of FIG. 3) can map location data to video frames of a predetermined video frame type from among video frames corresponding to the image data. Video frame types include I (Intra) frame, P (Predicted) frame and B (Bidirectional) frame. For example, the location data is mapped to I frame from among the video frames of the image data.

The first controller (170 of FIG. 3) of the vehicle navigation system (100 of FIG. 3) may map the location data with the image data at predetermined intervals. For example, the first controller (170 of FIG. 3) of the vehicle navigation system (100 of FIG. 3) can map the location data with the image data at a predetermined interval of one minute or 5 minutes.

The first controller (170 of FIG. 3) of the vehicle navigation system (100 of FIG. 3) may map current location data obtained using current location data regarding a vehicle with the image data when the current location data is different from previous location data obtained using previous location data of the vehicle. For example, if location data obtained according to location data of the vehicle corresponds to a first place (Gangnam station), a second place (Gangnam station) and a third place (Yeoksam station), the second place (Gangnam station) is not mapped with the image data because the second place is equal to a previous place corresponding to the first place (Gangnam station) whereas the third place (Yeoksam station) is mapped with the image data because the third place is different from the previous place, that is, the second plate (Gangnam station).

While the vehicle navigation system (100 of FIG. 3) maps location data with image data in the above description, the vehicle black box (200 of FIG. 4) can map location data and place data with image data in the same manner.

The operation of storing image data according to an embodiment of the present invention will now be described in more detail.

The first controller (170 of FIG. 3) of the vehicle navigation system (100 of FIG. 3) can classify image data according to image data type and store classified the image data. That is, the first controller (170 of FIG. 3) of the vehicle navigation system (100 of FIG. 3) can classify folders according to image data type and store image data in a corresponding folder, or store image data with a file name including the image data type corresponding to the image data. Image data types include image data (referred to as "first image data type" hereinafter) obtained from a signal of a sensor set in the vehicle, image data (referred to as "second image data type" hereinafter) obtained according to operation of a user, and image data (referred to as "third image data type" hereinafter) obtained according to operation of the vehicle black box (200 of FIG. 4). That is, the first image data type ("event shown in FIG. 10 and "E" shown in FIG. 13) corresponds to image data obtained by photographing the inside or outside of the vehicle according to a signal of a sensor which senses external impact applied to the vehicle, speeding, rapid acceleration, rapid reduction, etc. of the vehicle, or external noise. The second image data type ("manual" shown in FIG. 10 and "M" shown in FIG. 13) corresponds to image data obtained by photographing the inside and/or outside of the vehicle at the request of the user. The third image data type ("anytime" shown in FIG. 10 and "A" shown in FIG. 13) corresponds to image data obtained by photographing the inside and/or outside of the vehicle while the vehicle black box (200 of FIG. 4) normally operates.

The first controller (170 of FIG. 3) of the vehicle navigation system (100 of FIG. 3) can classify image data according to location data and store the classified image data. That is, the first controller (170 of FIG. 3) of the vehicle navigation system (100 of FIG. 3) can classify folders according to location data and store image data in a corresponding folder, or store image data with a file name including the location data. When a plurality of location data are mapped with one image data, the image data can be divided into a plurality of image data pieces and stored.

While the vehicle navigation system (100 of FIG. 3) stores image data in the above description, the vehicle black box (200 of FIG. 4) can store image data in the same manner.

An image data list screen according to an embodiment of the present invention will now be described with reference to FIG. 10.

Figure 10:
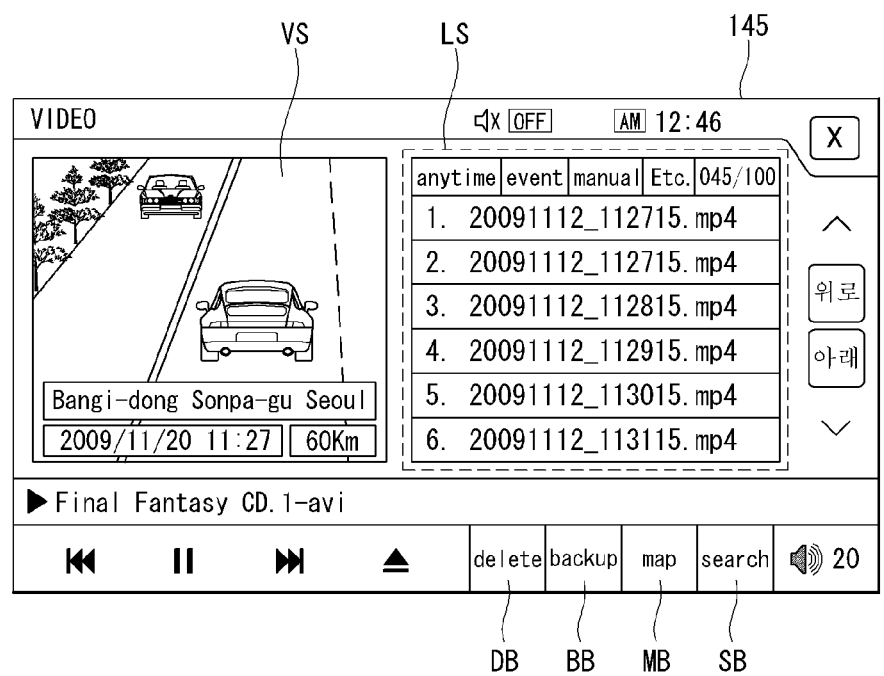
FIG. 10 shows an example of an image data list according to an embodiment of the present invention.

FIG. 10 illustrates an exemplary image data list screen according to an embodiment of the present invention.

When a user selects a menu such as an image display menu through the input unit (120 of FIG. 3) of the vehicle navigation system (100 of FIG. 3), the vehicle navigation system (100 of FIG. 3) displays the image data list screen as shown in FIG. 10 on the display (145 of FIG. 1).

The image data list screen includes an image display screen VS for displaying image data, an image list screen LS, a delete button DB, a backup button BB, a map button MB, a search button SB, etc.

The image list screen SL displays a list of image data stored in the first storage (150 of FIG. 3) of the vehicle navigation system (100 of FIG. 3). The first controller (170 of FIG. 3) of the vehicle navigation system (100 of FIG. 3) may display a list of image data stored in the second storage (250 of FIG. 4) of the vehicle black box (200 of FIG. 4) on the image list screen LS. That is, upon selection of the image display menu by the user, the first controller (170 of FIG. 3) of the vehicle navigation system (100 of FIG. 3) can receive the image data list from the vehicle black box (200 of FIG. 4) and display the received image data list on the image list screen LS. Here, the first controller (170 of FIG. 3) of the vehicle navigation system (100 of FIG. 3) may display statuses, such as 'connected', 'connection complete', 'connection fail', etc. on the display (145 of FIG. 1). Accordingly, the user can check whether the vehicle navigation system (10 of FIG. 3) is connected with the vehicle black box (200 of FIG. 4), whether connection of the vehicle navigation system (10 of FIG. 3) with the vehicle black box (200 of FIG. 4) fails, or whether the vehicle navigation system (10 of FIG. 3) and the vehicle black box (200 of FIG. 4) are being connected to each other.

An image selected by the user from the image data list displayed on the image list screen LS may be displayed in a different color or may be shaded, for example, such that the user can recognize the currently selected image. The image data list may be displayed differently according to image data type using a tab. Furthermore, a corresponding image data type can be indicated for each item displayed on the image list screen LS.

An image selected by the user from the image data list displayed on the image list screen LS is displayed on the image display screen VS. Here, when the user touches the image display screen VS, the image display screen VS is changed to a full screen. When the user touches the image display screen VS again, the full screen can be returned to the image display screen VS in the original size. Here, location data and place data mapped to image data can be displayed along with the image on the image play screen VS. When the image data includes speed information, the speed information can also be displayed on the image display screen VS.

The delete button DB is used to delete currently selected image data. When the user selects the delete button DB, the first controller (170 of FIG. 3) of the vehicle navigation system (100 of FIG. 3) deletes the currently selected image data. Here, to prevent image data from being deleted due to a wrong operation of the user, it is possible to check whether the user wants to delete corresponding image data through a pop-up window, for example. When the image data list displayed on the image list screen LS is received from the vehicle black box (200 of FIG. 4), the first controller (170 of FIG. 3) of the vehicle navigation system (100 of FIG. 3) requests the vehicle black box (200 of FIG. 4) to delete the currently selected image data. Then, the second controller (270 of FIG. 4) of the vehicle black box (200 of FIG. 4) deletes the corresponding image data.

The backup button BB is used to store the currently selected image data as a backup. When the user selects the backup button BB, the first controller (170 of FIG. 3) of the vehicle navigation system (100 of FIG. 3) stores the currently selected image data as a backup. To prevent backup image data from being deleted due to an erroneous operation of the user, it is possible to store the image data as a backup in a system region. It is also possible to store all image data in the image data list as a backup. When the image data list displayed on the image list screen LS is received from the vehicle black box (200 of FIG. 4), the first controller (170 of FIG. 3) of the vehicle navigation system (100 of FIG. 3) requests the vehicle black box (200 of FIG. 4) to store the currently selected image data as a backup. Then, the second controller (270 of FIG. 4) of the vehicle black box (200 of FIG. 4) stores the corresponding image data as a backup.

The map button MB is used to provide a simulation driving function or a location view function. When the user selects the map button MB, a simulation driving menu and a location view menu are displayed on the display (145 of FIG. 1) in the form of a pop-up window, for example. Upon selection of the simulation driving menu or location view menu by the user, the corresponding function is executed. If location data and place data are not mapped with the currently selected image data, the map button MB may be disabled.

The search button SB is used to search an image.

A search function according to an embodiment of the present invention will now be described with reference to FIGS. 11, 12 and 13.

Figure 11:
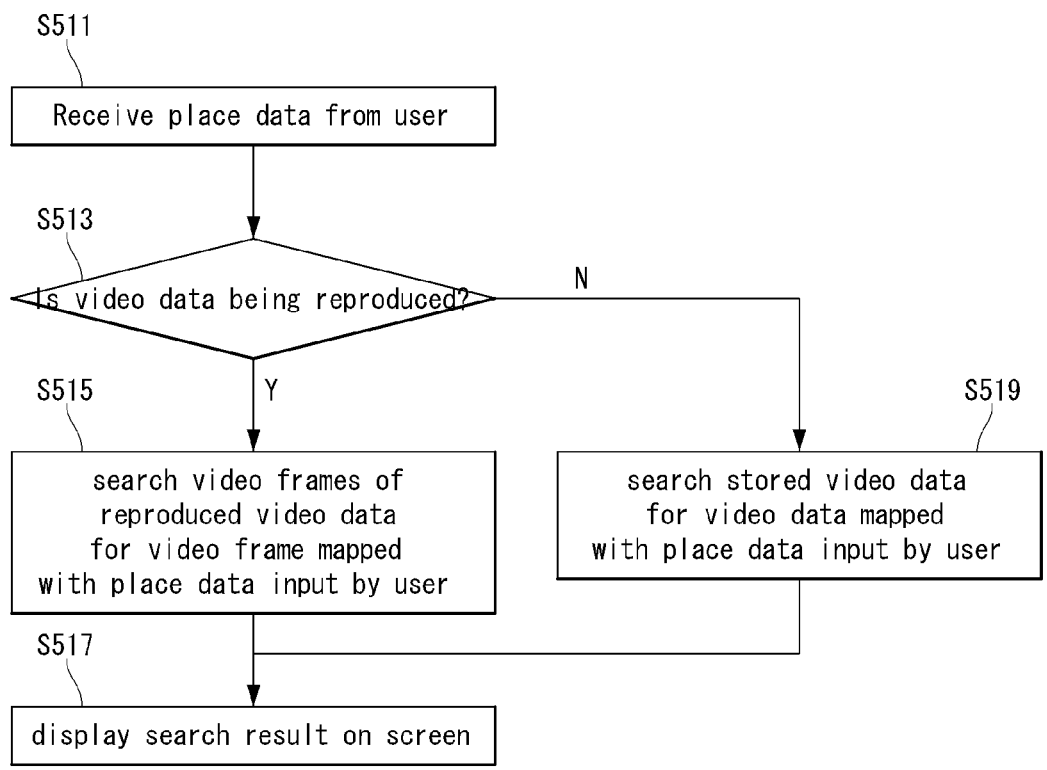
FIG. 11 is a flowchart illustrating a search function according to an embodiment of the present invention.
Figure 12:
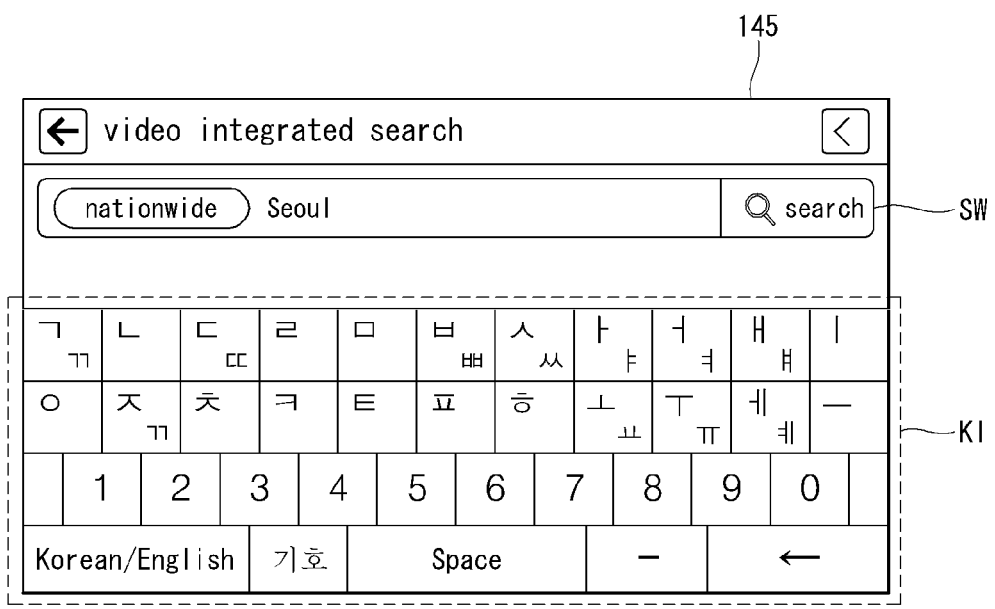
FIG. 12 shows an example of a search word input screen according to an embodiment of the present invention.

FIG. 11 is a flowchart illustrating the search function according to an embodiment of the present invention, FIG. 12 shows an example of a search word input screen according to an embodiment of the present invention, and FIG. 13 shows an example of a search result screen according to an embodiment of the present invention.

The user inputs place data through the input unit (120 of FIG. 3) of the vehicle navigation system (100 of FIG. 3) (S511). As shown in FIG. 12, the search word input screen includes a search word input part SW and a keyboard part KI. The user can input a desired search word (place data) into the search word input part SW through the keyboard part KI.

If image data is being reproduced (S513-Y), the first controller (170 of FIG. 3) of the vehicle navigation system (100 of FIG. 3) searches video frames of the reproduced image data for a video frame mapped to the place data input by the user (S515).

If the image data is not being reproduced (S513-N), the first controller (170 of FIG. 3) of the vehicle navigation system (100 of FIG. 3) searches the first storage (150 of FIG. 3) for image data mapped to the place data input by the user (S519). When the image data is stored in the vehicle black box (200 of FIG. 4), the first controller (170 of FIG. 3) of the vehicle navigation system (100 of FIG. 3) may request the vehicle black box (200 of FIG. 4) to search the corresponding image data and receive a search result from the vehicle black box (200 of FIG. 4).

Then, the first controller (170 of FIG. 3) of the vehicle navigation system (100 of FIG. 3) displays the search result on the display (145 of FIG. 1). Referring to FIG. 13, the search result screen displays a list of image data mapped with the place data input by the user. Each item is composed of an image data file name part FN, an additional information part AI, and an image data type part VT. Address information ((a) of FIG. 13) or POI information ((b) of FIG. 13) may be displayed in the additional information part AI. An image data type may be displayed in the image data type part VT. Accordingly, the user can recognize whether image data has been obtained according to a signal of a sensor attached to the vehicle, obtained at the request of the user, or obtained when the vehicle black box (200 of FIG. 4) is operated.

When the image data is searched during image data reproduction, the first controller (170 of FIG. 3) of the vehicle navigation system (100 of FIG. 3) may display a video frame (thumbnail image) list instead of the image data list on the search result screen 145. Here, time information of the video frame may be displayed in the image data file name part FN. For example, time information such as "1:10~3:20" can be displayed in the image data file name part FN.

Since place data is mapped with image data, as described above, the user can easily search the corresponding image data or video frame using the place data.

The simulation driving function according to an embodiment of the present invention will now be described with reference to FIGS. 14 and 15.

Figure 14:
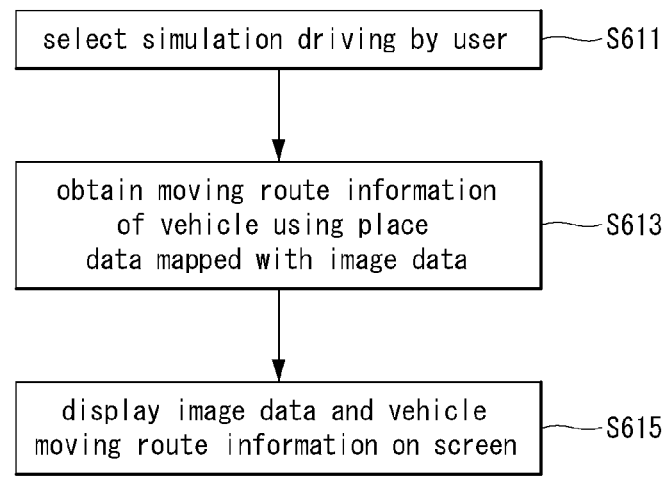
FIG. 14 is a flowchart illustrating a simulation driving function according to an embodiment of the present invention.
Figure 15:
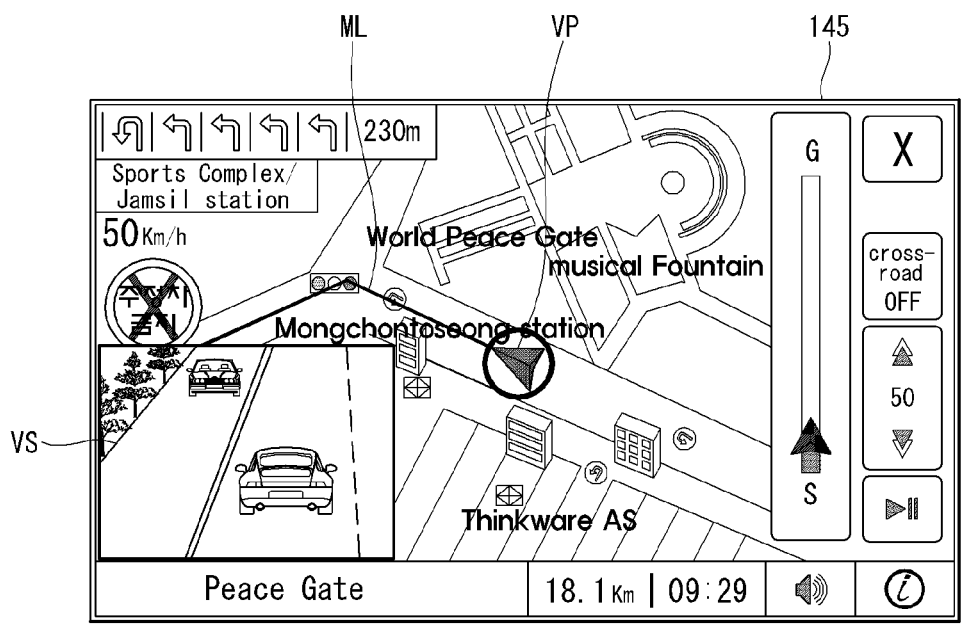
FIG. 15 shows an example of a simulation driving screen according to an embodiment of the present invention.

FIG. 14 is a flowchart illustrating the simulation driving function according to an embodiment of the present invention and FIG. 15 shows an example of a simulation driving screen according to an embodiment of the present invention.

When the user selects the map button (MB of FIG. 10) and the simulation driving menu through the input unit (120 of FIG. 3) of the vehicle navigation system (100 of FIG. 3) (S611), the first controller (170 of FIG. 3) of the vehicle navigation system (100 of FIG. 3) obtains vehicle moving route information using location data mapped with currently selected image data (S613). The vehicle moving route information includes a plurality of location data which are arranged with the lapse of time.

The first controller (170 of FIG. 3) of the vehicle navigation system (100 of FIG. 3) displays the image data and the vehicle moving route information on the display (145 of FIG. 1). Referring to FIG. 15, a vehicle moving route ML is displayed on a map. The video display screen VS displays the currently selected image data. A vehicle position VP is updated when image data is reproduced. The video play screen VS may be displayed in the form of PIP (Picture In Picture), NIP (Navigation In Picture) or the like.

As described above, moving route information of an accident vehicle can be confirmed in the event of a car accident by displaying moving route information obtained using location data mapped with image data, and thus the moving route information can be used as reference data to determine the cause of the accident.

The location view function according to an embodiment of the present invention will now be described with reference to FIGS. 16 and 17.

Figure 16:
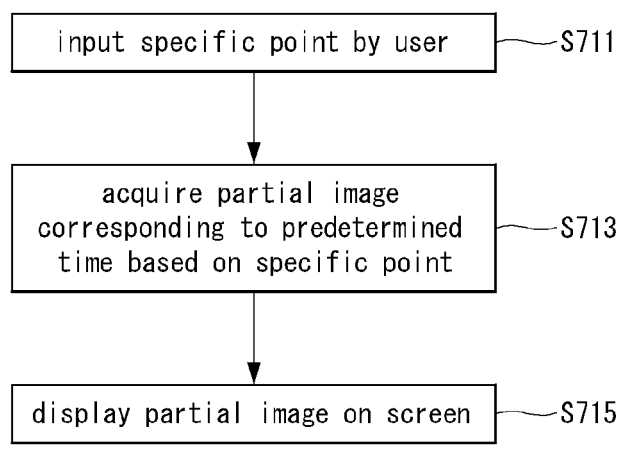
FIG. 16 is a flowchart illustrating a location view function according to an embodiment of the present invention.
Figure 17:
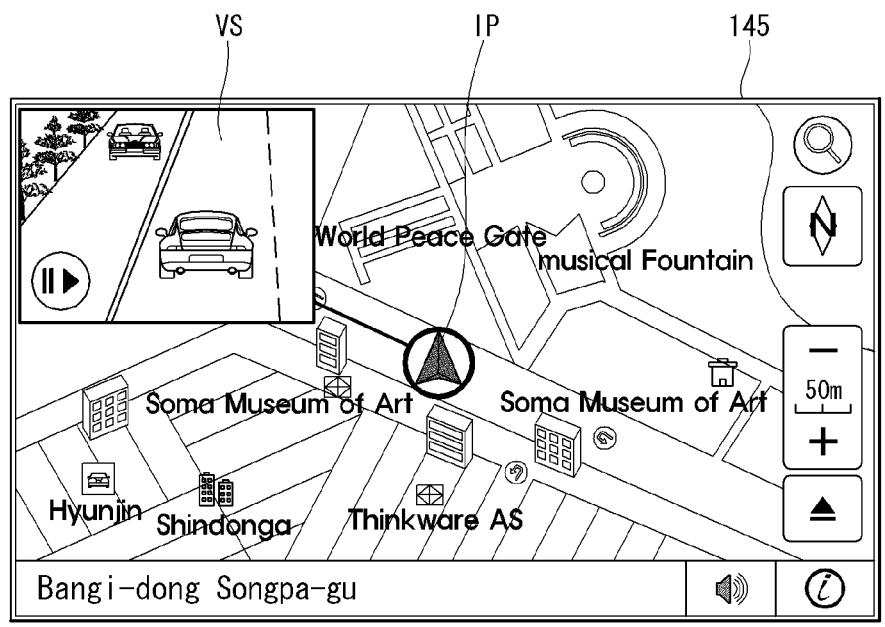
FIG. 17 shows an example of a location view screen according to an embodiment of the present invention.

FIG. 16 is a flowchart illustrating the location view function according to an embodiment of the present invention and FIG. 17 shows an example of a location view screen according to an embodiment of the present invention.

When the user selects the map button (MB of FIG. 10) and the location view menu through the input unit (120 of FIG. 3) of the vehicle navigation system (100 of FIG. 3), the first controller (170 of FIG. 3) of the vehicle navigation system (100 of FIG. 3) displays currently selected image data on the display (145 of FIG. 1).

Then, when the user inputs a specific location through the input unit (120 of FIG. 3) of the vehicle navigation system (100 of FIG. 3), the first controller (170 of FIG. 3) of the vehicle navigation system (100 of FIG. 3) obtains, from all images corresponding to the image data, some images corresponding to a predetermined time on the basis of the specific location (S713). The first controller (170 of FIG. 3) of the vehicle navigation system (100 of FIG. 3) displays the obtained images on the display (145 of FIG. 1). Referring to FIG. 17, the specific location IP input by the user is displayed on the map. The images corresponding to the predetermined time on the basis of the specific location IP are iteratively played on the video play screen VS. For example, when the user inputs a specific location while the image data is reproduced, images corresponding to one minute or 5 minutes based on the specific location are iteratively played.

As described above, only some images corresponding to a predetermined time, which are obtained on the basis of a specific location, can be played, and thus it is possible to check only an image obtained from a point that is important to determine the cause of a car accident in the event of the car accident and use the image as reference data to determine the cause of the accident.

The image data list screen shown in FIG. 10, the search word input screen shown in FIG. 12, the search result screen shown in FIG. 3, the simulation driving screen shown in FIG. 15 and the location view screen shown in FIG. 17 are exemplary and they may be configured in other forms.

While image data mapped with location data and place data are stored in the vehicle navigation system (100 of FIG. 3) or the vehicle black box (200 of FIG. 4) in the above embodiments, the vehicle navigation system (100 of FIG. 3) or the vehicle black box (200 of FIG. 4) can transmit the image data mapped with location data and place data to the electronic devices (61 and 62 of FIG. 5) through the network (30 of FIG. 5). Then, the electronic devices (61 and 62 of FIG. 5) store the image data received from the vehicle navigation system (100 of FIG. 3) or the vehicle black box (200 of FIG. 4). In addition, the electronic devices (61 and 62 of FIG. 5) can transmit the image data to the vehicle navigation system (100 of FIG. 3) or the vehicle black box (200 of FIG. 4) at the request of the vehicle navigation system (100 of FIG. 3) or the vehicle black box (200 of FIG. 4).

The method for controlling the vehicle navigation system according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A vehicle navigation system apparatus for a vehicle comprising:
    a box in the vehicle including:
        a camera for capturing image data;
        an information location module for providing current location data, wherein the image data is obtained for a predetermined time or has a predetermined size, and wherein the image data includes a plurality of video frames, including intra(I) frames, predicted(P) frames, and bidirectional(B) frames;
        a first controller configured to associate image data with current location data; and
        a first communication unit configured to transmit image data with associated current location data, and
    a navigation apparatus in the vehicle including:
        a storage configured to store map data;
        a second communication unit configured to receive, from the first communication unit, image data captured by the box having associated current location data; and
        a second controller configured to obtain place data from the map data in the storage using the associated current location data, map the received image data with the place data from the storage and store the mapped image data,
    wherein the second controller is configured to map the place data to the intra video frames of the image data.

2. The vehicle navigation system of claim 1, wherein the place data includes at least one of address data, road data and POI (point of interest) data.

3. The vehicle navigation system of claim 2, wherein the controller is configured to store the mapped image data in the storage as a separate file,
wherein the place data in the mapped image includes time data and is synchronized with the received image data with associated current location data using the time data.

4. The vehicle navigation system of claim 1, wherein, when the place data obtained using the associated current location data is different from previous place data obtained using previous location data of the vehicle, the second controller is configured to map the received image data with the place data using the associated current location data of the received image data.

5. The vehicle navigation system of claim 1, wherein the controller is configured to map the place data with the received image data at a predetermined interval.

6. The vehicle navigation system of claim 1, the navigation apparatus further including:
an input unit,
wherein the second controller is further configured to search the storage for a video frame mapped with place data input through the input unit.

7. The vehicle navigation system of claim 1, wherein the second controller is further configured to classify the received image data on the basis of the place data and store the classified image data.

8. The vehicle navigation system of claim 1, the navigation apparatus further including:
a sensor for detecting an operation of a user,
wherein the second controller is further configured to classify the received image data on the basis of at least one predetermined image data type and store the classified image data,
wherein the at least one image data type includes at least one of image data obtained according to a signal of the sensor installed in the vehicle and image data obtained according to an operation of a user.

9. The vehicle navigation system of claim 1, the navigation apparatus further including:
an input unit; and
a display,
wherein the second controller is further configured to display a part of all images corresponding to the received image data, which correspond to a predetermined time determined on the basis of information on a location, input through the input unit, through the display.

10. The vehicle navigation system of claim 1, wherein the location data is obtained using a GNSS signal received from an artificial satellite.

11. A method for controlling a vehicle navigation system, comprising:
obtaining current location data of a vehicle with an information location module in a box installed in a vehicle;
capturing image data with a camera in the box, wherein the image data includes a plurality of video frames including intra(I) frames, predicted(P) frames, and bidirectional(B) frames;
associating the image data with the current location data;
transmitting image data having associated current location data from the box;
receiving the image data having associated current location data from the box into a navigation apparatus;
acquiring place data from map data stored in the navigation apparatus using the associated current location data; and
mapping the place data acquired from map data stored in the navigation apparatus into the intra video frames of the image data;
storing the mapped image data;
the storing of the mapped data comprises mapping the place data to the intra video frames;
inputting place data into an input unit; and
searching for intra video frames mapped with the input place data.

12. The method of claim 11, wherein the place data includes at least one of address data, road data and POI (point of interest) data.

13. The method of claim 11, wherein the storing of the mapped data comprises storing the place data mapped with the received image data as a separate file,
wherein the place data includes time data and is synchronized with the received image data using the time data.

14. The method of claim 11, further comprising displaying some of all images corresponding to the image data, which correspond to a predetermined time determined on the basis of information on a location, input through the input unit.

15. A non-transitory computer readable medium storing a program for executing the method of claim 11.

* * * * *